(12) United States Patent
Deisher et al.

(10) Patent No.: US 9,419,677 B2
(45) Date of Patent: Aug. 16, 2016

(54) REMOVAL OF MODULATED TONAL INTERFERENCE

(75) Inventors: Michael E. Deisher, North Plains, OR (US); Keith R. Tinsley, Beaverton, OR (US)

(73) Assignee: Intel Corporation, Santa Clara, CA (US)

(*) Notice: Subject to any disclaimer, the term of this patent is extended or adjusted under 35 U.S.C. 154(b) by 2265 days.

(21) Appl. No.: 12/317,092

(22) Filed: Dec. 19, 2008

(65) Prior Publication Data
US 2010/0158075 A1 Jun. 24, 2010

(51) Int. Cl.
*H04B 1/7097* (2011.01)

(52) U.S. Cl.
CPC .................................. *H04B 1/7097* (2013.01)

(58) Field of Classification Search
CPC ..................................................... H04B 1/7097
USPC ......... 375/130, 144, 148, 295, 296, 316, 345, 375/346, 350, 354; 455/296, 114.2, 63.1
See application file for complete search history.

(56) References Cited

U.S. PATENT DOCUMENTS

| | | | |
|---|---|---|---|
| 5,301,363 A * | 4/1994 | Hinderks ...................... | 455/101 |
| 5,410,750 A | 4/1995 | Cantwell et al. | |
| 5,793,818 A * | 8/1998 | Claydon et al. ............... | 375/326 |
| 6,137,888 A * | 10/2000 | McClennon et al. ......... | 381/318 |
| 7,277,475 B1 * | 10/2007 | Nguyen et al. ................ | 375/148 |
| 7,279,979 B2 | 10/2007 | Autti | |
| 2003/0118080 A1 * | 6/2003 | Hailey ......................... | 375/130 |
| 2005/0100119 A1 | 5/2005 | Husted et al. | |
| 2006/0290434 A1 | 12/2006 | Bettner et al. | |
| 2007/0297521 A1 | 12/2007 | Guo et al. | |
| 2008/0077337 A1 * | 3/2008 | Yoshinaga ..................... | 702/57 |
| 2008/0081586 A1 | 4/2008 | Sreerama et al. | |

FOREIGN PATENT DOCUMENTS

| EP | 1158676 A2 | 11/2001 |
|---|---|---|
| JP | 2001339320 A | 12/2001 |

OTHER PUBLICATIONS

International Search Report and Written Opinion received for PCT Patent Application No. PCT/US2009/066744, mailed on Jul. 16, 2010, 7 pages.
Wang, Chenshu, et al., "Performance Analysis of Instantaneous Frequency-Based Interference Excision Techniques in Spread Spectrum Communications", IEEE Transactions on Signal Processing, vol. 46, No. 1, Jan. 1998, pp. 70-82.

* cited by examiner

*Primary Examiner* — Vineeta Panwalkar
(74) *Attorney, Agent, or Firm* — International IP Law Group, P.L.L.C.

(57) ABSTRACT

In some embodiments a phase between a periodic spreading signal and an effective spreading signal modulating an interfering harmonic is determined, an amplitude of the interfering harmonic is estimated, and the interfering harmonic is canceled from a received signal. Other embodiments are described and claimed.

29 Claims, 4 Drawing Sheets

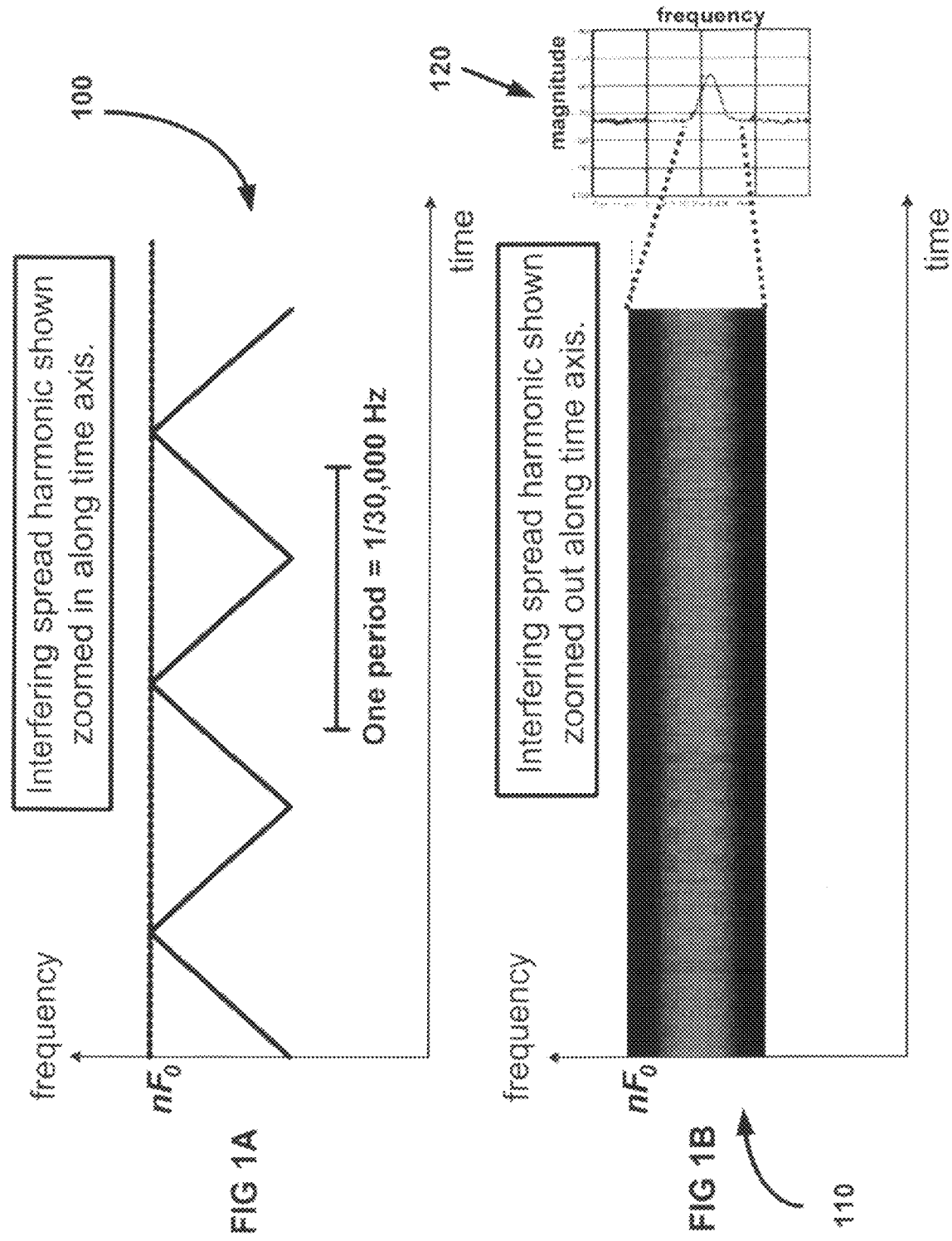

REMOVAL OF MODULATED TONAL INTERFERENCE

TECHNICAL FIELD

The inventions generally relate to removal of modulated tonal interference.

BACKGROUND

Wireless networks and wireless communications have become prevalent throughout society. This has created the need for increased capacity as well as faster and more reliable wireless communication techniques. A difficulty in wireless communications is interference caused by high speed signals from, for example and not limited to, notebook personal computers (PCs) causing interference with wireless devices such as, for example, and not limited to wireless local area networks (wireless LANs), wireless wide area networks (WWANs), and/or other wireless networks embedded, for example, in a mobile platform.

Certain signals generated in a notebook computer, for example, have been found to be serious sources of radio frequency interference (RFI). In particular, clocking signals used to transfer data to and from various portions of the PC (for example, between a processor and a memory) have been found to be sources of electromagnetic interference (EMI).

Spread spectrum clocking is a technique for reducing the average amplitude of clock harmonics by spreading the energy at a fundamental clock frequency over a small frequency interval. Although this technique is effective at reducing interference to radio receivers, it is not sufficient in many important cases, such as for example and not limited to, a global positioning system (GPS) on small form factor devices.

The present inventors have noticed that current tone suppression techniques such as tone excision, notch filtering, and adaptive filtering assume that the tonal interferer has a fixed frequency or is slowly time varying. They do not exploit the known structure of spread clock harmonics and, therefore, end up unnecessarily removing much of the signal energy that is near the interferer.

U.S. Pat. No. 7,279,989 issued on Oct. 9, 2007 to Bettner et al. and assigned to Intel Corporation addresses the problem of RFI due to clock harmonics. This patent discloses clock noise mitigation using a frequency adaptive process.

U.S. patent application publication 2008/0081586 published on Apr. 3, 2008 to Sreerama et al. and assigned to Intel Corporation discloses the management of system clocks to reduce RFI. A frequency range of at least one active channel of at least one wireless communication RF band is identified, an overlap between the frequency range of the at least one active channel and the frequency range of the at least one clock harmonic is identified, and a fundamental frequency of the at least one clock is shifted to shift the frequency range of the at least one harmonic out of the frequency range of the at least one active channel.

An IEEE publication entitled "Performance Analysis of Instantaneous Frequency-Based Interference Excision Techniques in Spread Spectrum Communications" to Chensu Wang and Moeness G. Amin (IEEE Transactions on Signal Processing, Vol. 46, No. 1, January 1998) discloses using open-loop adaptive excision filters for mitigation in direct sequence spread spectrum communications.

The present inventors have identified a need for improved RFI suppression.

BRIEF DESCRIPTION OF THE DRAWINGS

The inventions will be understood more fully from the detailed description given below and from the accompanying drawings of some embodiments of the inventions which, however, should not be taken to limit the inventions to the specific embodiments described, but are for explanation and understanding only.

FIGS. 1A, 1B and 1C illustrate frequency vs. time comparisons in explaining some embodiments of the inventions.

DETAILED DESCRIPTION

Figure 1C:
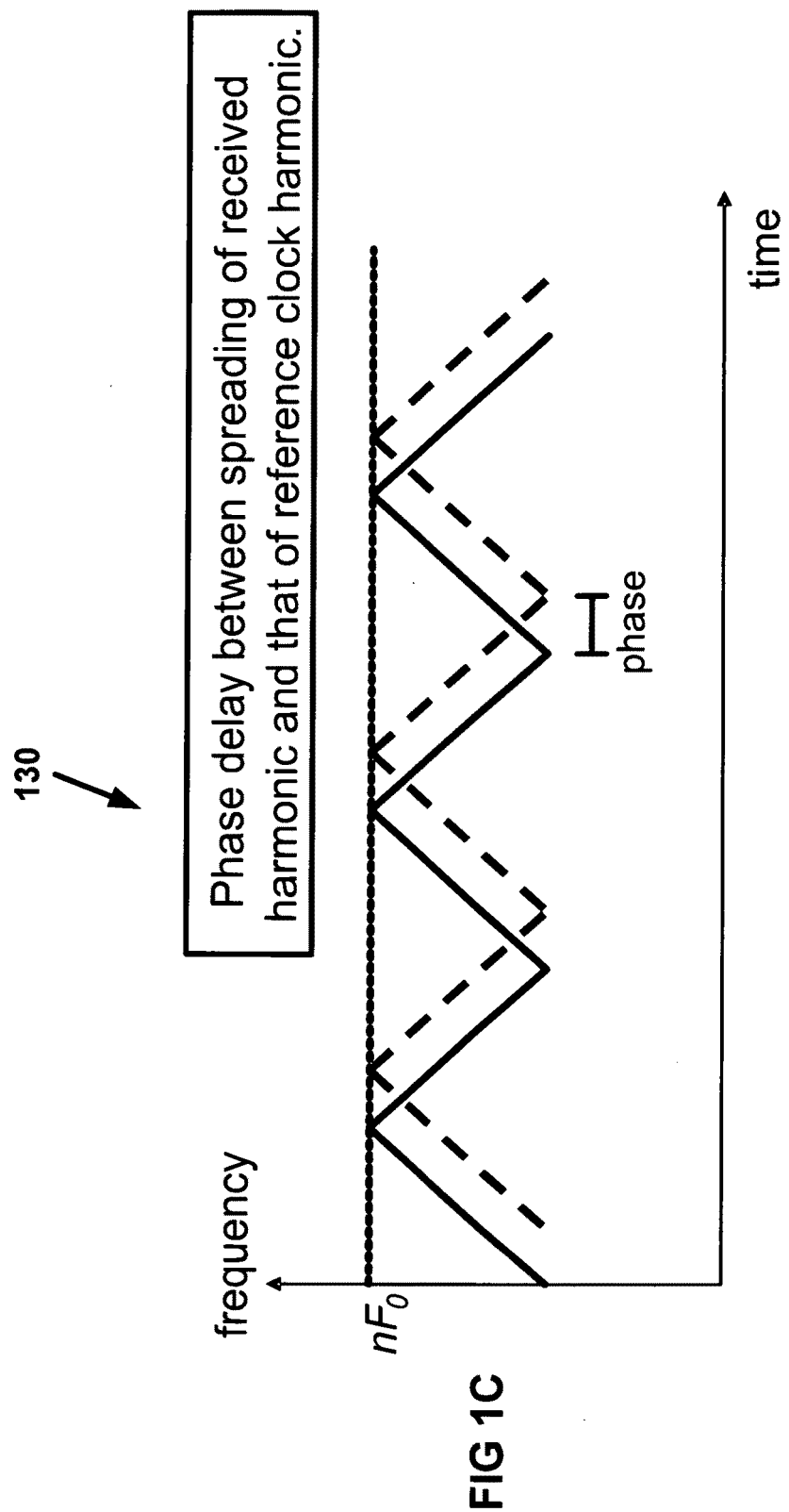

Some embodiments of the inventions relate to removal of modulated tonal interference.

In some embodiments a phase between a periodic spreading signal and an effective spreading signal modulating an interfering harmonic is determined, an amplitude of the interfering harmonic is estimated, and the interfering harmonic is canceled from received signal (for example, a received communication signal). Other embodiments are described and claimed.

In some embodiments a phase estimator determines a phase between a periodic spreading signal and an effective spreading signal modulating an interfering harmonic, an amplitude estimator estimates an amplitude of the interfering harmonic, and a tone suppressor cancels the interfering harmonic from a received signal.

In some embodiments a system includes a computing platform, a radio coupled to the computing platform (and/or included in the computing platform), and an interference suppressor. The radio is to transmit and receive radio frequency signals. The interference suppressor is to track small deviations in the fundamental frequency of one or more clocks interfering with the radio frequency signals and to cancel or attenuate clock harmonic interference. The interference suppressor includes a phase estimator that determines a phase between a periodic spreading signal and an effective spreading signal modulating an interfering harmonic, an amplitude estimator that estimates an amplitude of the interfering harmonic, and a tone suppressor that cancels the interfering harmonic from a received signal.

Spread spectrum clocking is a technique for reducing the average amplitude of clock harmonics by spreading the energy at a fundamental clock frequency over a small frequency interval. Current tone excision algorithms treat spread clock harmonics as a wide interferer rather than as a time varying narrow interferer. Tone puncturing may be used according to some embodiments in which a portion of the spectrum may be notched out. However, if a wide chunk is taken out signal degradation occurs. According to some embodiments, there are fewer bit errors by taking out a smaller portion of the spectrum. That is, according to some embodiments, tracking may be used to take out much smaller portions of the spectrum, resulting in fewer bit errors. In this manner, spread clock harmonics are treated as a time varying narrow interferer. This provides a much improved result compared with typical tone suppression techniques.

FIG. 1A illustrates a spread clock harmonic spectrogram 100 according to some embodiments. In spectrogram 100, frequency is shown on the vertical axis and time is shown on the horizontal axis. An interfering spread harmonic is shown zoomed in along the time axis. The frequency variation due to the spreading function is illustrated in FIG. 1A using a triangle wave spreading function. However, when the observation bandwidth is large, such as, for example, with orthogonal frequency division multiplier (OFDM) receivers or spectrum analyzers, this frequency variation is not observable and the energy appears to be spread over a small frequency interval.

FIG. 1B illustrates how some current methods attempt to remove all energy within the frequency band using spectrogram 110. In spectrogram 110, frequency is shown on the vertical axis and time is shown on the horizontal axis, and magnitude vs. frequency is illustrated on the exploded view in the graph 120 illustrated on the right side of FIG. 1B.

FIG. 1B is contrasted with some embodiments of the inventions, in which only the true, time-varying, narrow interferer is removed. In this manner, much less of the information bearing signal is removed along with the interference, leading to fewer communication errors, higher throughput, and increased wireless range.

FIG. 1C illustrates a spread clock harmonic spectrogram 130 according to some embodiments. In spectrogram 130, frequency is shown on the vertical axis and time is shown on the horizontal axis. Spectrogram 130 illustrates a phase delay between a spreading function of a reference clock harmonic (triangle wave shown in solid line in FIG. 1C) and an effective spreading function of a received harmonic (triangle wave shown in dotted line in FIG. 1C).

Figure 2:
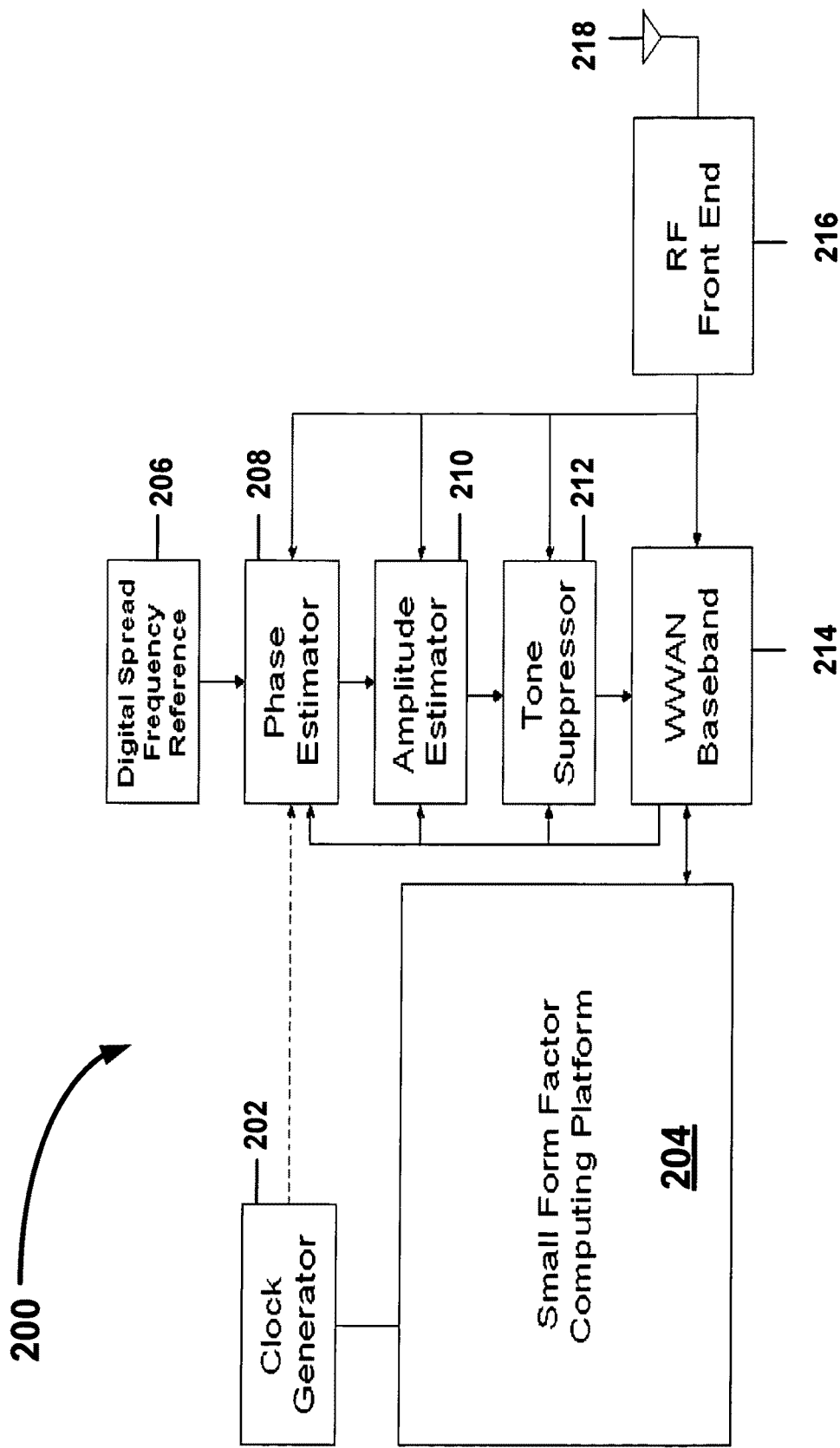
FIG. 2 illustrates a system according to some embodiments of the inventions.

FIG. 2 illustrates a system 200 according to some embodiments. System 200 includes a clock generator 202, a small form factor computing platform 204 (for example and not limited to a notebook computer platform, a handheld device platform, etc.), a digital spread frequency reference 206, a phase estimator 208, an amplitude estimator 210, a tone suppressor 212, a wireless wide area network (WWAN) baseband 214, a radio frequency (RF) front end 216, and/or a radio 218 (for example, a radio transceiver including a transmitter and a receiver). In some embodiments, phase estimator 208 and amplitude estimator 210 are included in and/or comprise an interference estimator and/or an interference tracker (for example, in some embodiments tracking a drift). In some embodiments, phase estimator 208, amplitude estimator 210, and/or tone suppressor 212 are included in and/or comprise an interference suppressor. In some embodiments WWAN baseband 214 is any radio baseband and/or any digital baseband, and is not limited in all embodiments to a WWAN baseband. In some embodiments, any or all of the elements in system 200 may be implemented in any combination of hardware and/or software.

System 200 tracks small deviations in the fundamental frequency of interfering clocks in order to more effectively cancel or attenuate clock harmonic interference. In some embodiments, phase estimator 208 determines a phase differences between a signal including interference and a reference clock signal. In some embodiments, phase estimator 208 provides phase tracking and/or measurement. Phase estimator 208 determines the phase (for example, the angular difference in time) between the periodic spreading signal and an effective spreading signal modulating the interfering harmonic. This is accomplished according to some embodiments by direct measurement of the spreading signal (for example, requiring a wire connection such as that illustrated by the dotted line between clock generator 202 and phase estimator 208 in FIG. 2). In some embodiments in which a line between the clock generator and phase estimator is not possible, a reference signal may be generated. In some embodiments, phase estimator 208 determines the phase by using an artificially generated digital reference (for example, from digital spread frequency reference 206) together with a phase locked loop. In some embodiments, phase estimator 208 demodulates an interfering harmonic to recover, for example, a noisy, delayed copy of the spreading function, and then estimates a delay. In some embodiments, phase estimator 208 determines the phase using an adaptive minimum mean square error (MMSE) estimator. In some embodiments, the form of the spreading function (for example, saw tooth, triangle, sine, etc.) is known in advance, and/or may be determined (for example, as part of the MMSE estimation). In some embodiments, phase estimator 208 includes and/or comprises a clock recovery circuit. In some embodiments, phase estimator 208 estimates the phase using any hardware and/or software implementations.

According to some embodiments, phase estimator 208 determines a phase between a periodic spreading signal and an effective spreading signal modulating an interfering harmonic. For example, according to some embodiments, phase estimator 208 determines the phase illustrated in FIG. 1C between the periodic spreading signal as illustrated by the solid line in FIG. 1C and the effective spreading signal modulating an interfering harmonic as illustrated by the dotted line in FIG. 1C.

According to some embodiments, amplitude estimator 210 estimates the amplitude of the interfering harmonic. In some embodiments, this is accomplished, for example, using an adaptive filter (for example, in some embodiments a single tap adaptive filter), and/or using known spectral estimation techniques. In some embodiments, the amplitude is estimated independently of the phase. In some embodiments, the amplitude is estimated jointly with the phase.

According to some embodiments, tone suppressor 212 cancels the interfering harmonic from a received signal received via radio 218 using subtractive canceling techniques, adaptive cancellation, and/or time-varying narrowband filtering.

According to some embodiments of the inventions (for example, as illustrated in FIG. 2 and described in reference thereto), only the true, time-varying, narrow interferer is removed from the received signal. In this manner, much less of the information bearing signal is removed along with the interference, leading to fewer communication errors, higher throughput, and increased wireless range.

Although one clock generator is illustrated in FIG. 2, according to some embodiments more than one clock generator, clock signal and/or reference signal may be included in a system in which phase estimation is performed (for example, on each of the clock signals and/or reference signals). Although one radio is illustrated in FIG. 2, according to some embodiments more than one radio may be included. Moreover, once the phase difference for a particular interfering harmonic is recovered, the phase difference for other interfering harmonics that impact other radios sharing a single RF front end may be simply calculated.

Figure 3:
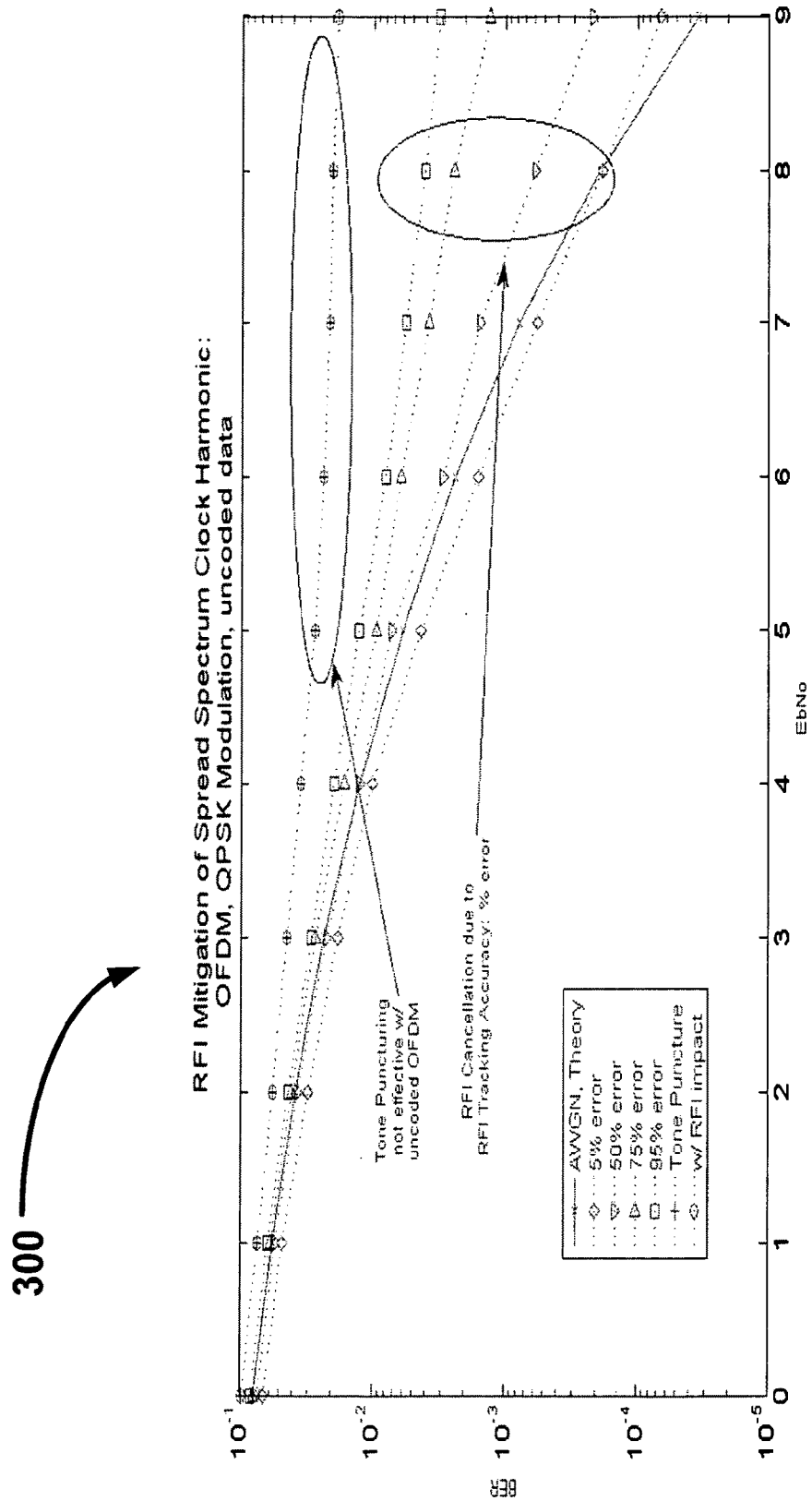
FIG. 3 illustrates radio frequency interference (RFI) mitigation of a spread spectrum clock harmonic according to some embodiments of the inventions.

FIG. 3 illustrates a graph 300 according to some embodiments. Graph 300 illustrates bit error rate (BER) on the vertical axis and signal to noise ratio (Eb/No) on the horizontal axis. Graph 300 illustrates simulation results for RFI mitigation of spread spectrum clock harmonic with an orthogonal frequency division multiplexer (OFDM) communication system using quadrature phase shift key (QPSK) modulation of uncoded data. Bit error rate (BER) versus signal to noise ratio (Eb/No) curves are illustrated for co-channel clock harmonic interference. The combined amplitude and phase estimation error was varied from 5% to 95%, and curves were generated according to some embodiments. As illustrated in FIG. 3, BER is improved by up to two orders of magnitude relative to previous state of the art tone puncturing methods. This improvement is due to the fact that a much lower level of signal energy has been removed according to some embodiments.

According to some embodiments, multi-radio computing platforms have improved performance relative to prior systems, due to, for example, extended radio range, minimization of power required to achieve a given range, increased throughput at a given range, and/or increasing the number of wireless platforms that can co-exist in a given spatial location without interfering with each other. According to some embodiments, radio frequency interference (RFI) has a low impact upon radio performance.

Although some embodiments have been described herein as being implemented in a particular manner, according to some embodiments these particular implementations may not be required. For example, although some embodiments have been described in reference to a triangle wave, it is noted that some embodiments may be implemented in reference to any other type of spreading function (for example, in some embodiments, a sine wave, a saw tooth wave, any other type of wave, etc.)

Although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, the interfaces that transmit and/or receive signals, etc.), and others.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Although flow diagrams and/or state diagrams may have been used herein to describe embodiments, the inventions are not limited to those diagrams or to corresponding descriptions herein. For example, flow need not move through each illustrated box or state or in exactly the same order as illustrated and described herein.

The inventions are not restricted to the particular details listed herein. Indeed, those skilled in the art having the benefit of this disclosure will appreciate that many other variations from the foregoing description and drawings may be made within the scope of the present inventions. Accordingly, it is the following claims including any amendments thereto that define the scope of the inventions.

What is claimed is:

1. A method comprising:
   determining, by a phase estimator, a phase between a periodic spreading signal and an effective spreading signal, wherein the periodic spreading signal comprises a frequency variation of a harmonic of a reference clock signal, and wherein the effective spreading signal comprises a variation of an interfering harmonic in a received signal;
   estimating, by an amplitude estimator, an amplitude of the interfering harmonic; and
   canceling, by a tone suppressor, the interfering harmonic from the received signal based on the amplitude of the interfering harmonic and the phase between the periodic spreading signal and the effective spreading signal.

2. The method of claim 1, wherein the determining is performed using direct measurement of the periodic spreading signal.

3. The method of claim 1, further comprising generating a digital reference signal, wherein the determining is performed using the generated digital reference signal.

4. The method of claim 1, further comprising estimating a mean squared error, wherein the determining is performed using the estimated mean squared error.

5. The method of claim 1, further comprising determining a form of the periodic spreading signal.

6. The method of claim 1, wherein the estimating is performed independently of the determining.

7. The method of claim 1, wherein the estimating is performed jointly with the determining.

8. The method of claim 1, wherein the canceling is performed using subtractive canceling techniques, adaptive cancellation, adaptive filtering, and/or time-varying narrowband filtering.

9. The method of claim 1, wherein the canceling removes only a true time varying narrow interferer signal from the received signal.

10. An apparatus comprising:
a phase estimator to determine a phase between a periodic spreading signal and an effective spreading signal, wherein the periodic spreading signal comprises a frequency variation of a harmonic of a reference clock signal, and wherein the effective spreading signal comprises a variation of an interfering harmonic in a received signal;
an amplitude estimator to estimate an amplitude of the interfering harmonic; and
a tone suppressor to cancel the interfering harmonic from the received signal based on the amplitude of the interfering harmonic and the phase between the periodic spreading signal and the effective spreading signal.

11. The apparatus of claim 10, wherein the phase estimator is to determine the phase using direct measurement of the periodic spreading signal.

12. The apparatus of claim 10, wherein the phase estimator is further to generate a digital reference signal and to determine the phase using the generated digital reference signal.

13. The apparatus of claim 10, wherein the phase estimator is further to estimate a mean squared error and to determine the phase using the estimated mean squared error.

14. The apparatus of claim 10, wherein the phase estimator is further to determine a form of the periodic spreading signal.

15. The apparatus of claim 10, wherein the amplitude estimator is to estimate the amplitude independently of the phase estimator to determine the phase.

16. The apparatus of claim 10, wherein the amplitude estimator is to estimate the amplitude jointly with the phase estimator to determine the phase.

17. The apparatus of claim 10, wherein the amplitude estimator is an adaptive filter.

18. The apparatus of claim 10, wherein the tone suppressor is to use subtractive canceling techniques, adaptive cancellation, adaptive filtering, and/or time-varying narrowband filtering.

19. The apparatus of claim 10, wherein the tone suppressor is to remove only a true time varying narrow interferer signal from the received signal.

20. A system comprising:
a computing platform;
a radio coupled to the computing platform to transmit and receive radio frequency signals; and
an interference suppressor to track small deviations in the fundamental frequency of one or more clocks interfering with the radio frequency signals and to cancel or attenuate clock harmonic interference, the interference suppressor comprising:
a phase estimator to determine a phase between a periodic spreading signal and an effective spreading signal, wherein the periodic spreading signal comprises a frequency variation of a harmonic of a reference clock signal, and wherein the effective spreading signal comprises a variation of an interfering harmonic in a received signal;
an amplitude estimator to estimate an amplitude of the interfering harmonic; and
a tone suppressor to canceling the interfering harmonic from the received signal based on the amplitude of the interfering harmonic and the phase between the periodic spreading signal and the effective spreading signal.

21. The system of claim 20, wherein the phase estimator is to determine the phase using direct measurement of the periodic spreading signal.

22. The system of claim 20, wherein the phase estimator is further to generate a digital reference signal and to determine the phase using the generated digital reference signal.

23. The system of claim 20, wherein the phase estimator is further to estimate a mean squared error and to determine the phase using the estimated mean squared error.

24. The system of claim 20, wherein the phase estimator is further to determine a form of the periodic spreading signal.

25. The system of claim 20, wherein the amplitude estimator is to estimate the amplitude independently of the phase estimator to determine the phase.

26. The system of claim 20, wherein the amplitude estimator is to estimate the amplitude jointly with the phase estimator to determine the phase.

27. The system of claim 20, wherein the amplitude estimator is an adaptive filter.

28. The system of claim 20, wherein the tone suppressor is to use subtractive canceling techniques, adaptive cancellation, adaptive filtering, and/or time-varying narrowband filtering.

29. The system of claim 20, wherein the tone suppressor is to remove only a true time varying narrow interferer signal from the received signal.

* * * * *